United States Patent [19]
Hamasaki

[11] Patent Number: 5,990,952
[45] Date of Patent: Nov. 23, 1999

[54] DRIVING METHOD OF SOLID-STATE IMAGE PICKUP DEVICE

[76] Inventor: Masaharu Hamasaki, c/o Sony Corporation, 7-35, Kitashinagawa 6-Chome, Shinagawa-ku, Tokyo, Japan

[21] Appl. No.: 08/659,078

[22] Filed: Jun. 3, 1996

[30] Foreign Application Priority Data

Jun. 2, 1995 [JP] Japan ..................................... 7-136376

[51] Int. Cl.⁶ .................................................. H04N 3/14
[52] U.S. Cl. ........................................... 348/311; 348/322
[58] Field of Search ..................................... 348/311, 312, 348/322, 324

[56] References Cited

U.S. PATENT DOCUMENTS

| | | | |
|---|---|---|---|
| 4,656,518 | 4/1987 | Kosonocky et al. | 348/320 |
| 5,546,127 | 8/1996 | Yamashita et al. | 348/322 |
| 5,572,256 | 11/1996 | Egawa et al. | 348/312 |
| 5,606,366 | 2/1997 | Hieda et al. | 348/312 |

*Primary Examiner*—Wendy Garber
*Assistant Examiner*—Aung S. Moe
*Attorney, Agent, or Firm*—Hill & Simpson

[57] ABSTRACT

A method driving for a solid-state image pickup device in which it is possible to achieve a high dynamic range readout without causing unnaturalness in the reproduced picture particularly even when filming a subject moving at high speed. Primary signal charges are generated by adjacent first and second pixels and are subsequently mixed in the vertical transfer register. Auxiliary signal charges are also generated in adjacent first and second pixels, and, generation of the primary signal charge for the second pixel occurs prior to generation of the auxiliary signal charge of the first pixel.

15 Claims, 7 Drawing Sheets

FIG.2
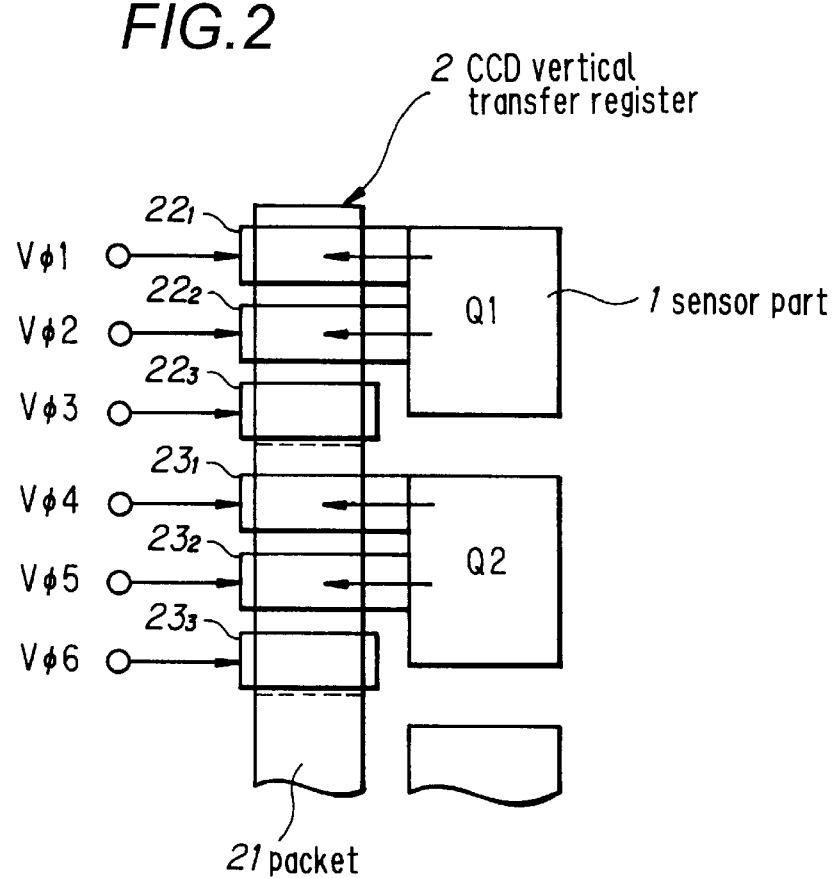
FIG.4A FIG.4B FIG.4C FIG.4D
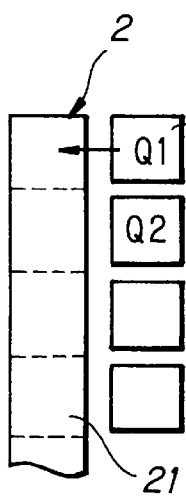 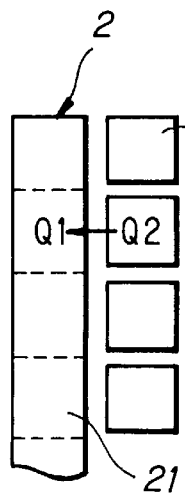 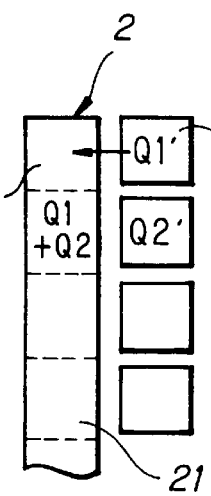 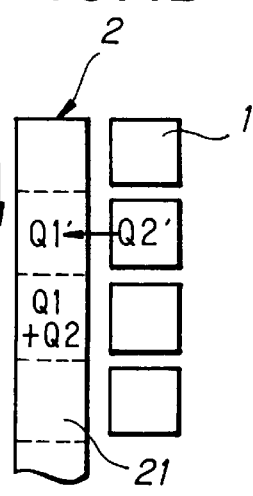
① ② ③ ④

DRIVING METHOD OF SOLID-STATE IMAGE PICKUP DEVICE

BACKGROUND OF THE INVENTION

1. Field of the Invention

The present invention relates to a method of driving a solid-state image pickup device, and, more particularly, the present invention relates to a method of driving an all-pixel readout type solid-state image pickup device to provide increased dynamic range and improved image quality.

2. Description of the Prior Art

High-performance solid-state image pickup devices are being developed which have an increased number of horizontal pixels as well as a reduced physical size. However, for vertical resolution, it is only possible to obtain 350 TV lines with a field accumulation readout method which is compatible with the NTSC broadcasting system and 240 TV lines of resolution with a still image not using a mechanical shutter. This is because it is necessary to be compatible with the NTSC broadcasting format wherein two fields consisting of 262.5 scanning lines are interlaced in a 2:1 ratio to make one frame and also more importance has been placed on having the displayed image look smooth rather than increased vertical resolution. Conventional devices as shown in FIG. 7(A), have been designed so that signal charges Q1, Q2 of sensors (pixels) 71 of two adjacent horizontal lines are mixed by being read out into single packets 73 corresponding to two pixels in a vertical transfer register 72. In the next field signal charges Q2, Q1 are mixed by combining two different lines and a signal of 262.5 lines is outputted per one field, that is, with one exposure. The variation in charge amount inside a sensor part 71 is shown in FIG. 7(B).

However, in order to use a non-interlace system or still image fields, compared with the horizontal resolution, the vertical resolution is inadequate. In these fields, it is necessary to have vertical resolution as good as the horizontal resolution in one exposure. As a solution to this, there are solid-state image pickup devices of all-pixel readout type wherein packets 83 are provided in 1:1 correspondence with the pixels (sensor parts 81) of the vertical transfer register 82, as shown in FIG. 8(A). All pixels are read out independently without signal charges being mixed in the vertical transfer register 82. However, this all-pixel readout type solid-state image pickup device has a problem because after signal charges are photoelectrically converted and accumulated in the sensor parts 81, when the output becomes saturated due to an overload of sensor parts 81, the signal output becomes constant and it is not possible to obtain a signal output in proportion to the amount of incident light. The dynamic range with respect to light input is thus narrow. This is because the pixels become saturated when the light is very intense. This also occurs in the case of the solid-state image pickup device of field accumulation readout type shown in FIG. 7. The variation in charge amount in a sensor part 81 is shown in FIG. 8(B) in proportion to incident light.

In this regard, so-called high dynamic range readout type solid-state image pickup devices have been known wherein, all-pixel readout has been made possible by providing packets in the vertical transfer registers in 1:1 correspondence with the pixels. The dynamic range with respect to light input is effectively widened by, after reading out signal charges of the effective period of the vertical direction, providing a short exposure period immediately thereafter within the vertical blanking period. This subsequent signal charge is photoelectrically converted, and added to the signal output of the signal charge for the original longer exposure period. This is performed in a single processing line.

In this high dynamic range readout type solid-state image pickup device, as shown in FIG. 9(A), first, 1) a main signal charge Q1 of a pixel of an odd line (sensor part 91) is read out and immediately thereafter the vertical transfer register 92 is shifted by one pixel. Then after an auxiliary signal charge Q1' is accumulated in the pixel of the odd line again in a short exposure time(2) a main signal charge Q2 of a pixel of an even line is read out at the same time as the auxiliary signal charge Q1'. As a result, the main signal charge Q2 and the main signal charge Q1 are mixed and the auxiliary signal charge Q1' is read out into an empty packet 93. Then the vertical transfer register 92 is shifted by one pixel and then after an auxiliary signal charge Q2' is accumulated again in the pixel of the even line in a short exposure period (3) this auxiliary signal charge Q2' is read out. As a result of this process, the auxiliary signal charge Q2' is mixed with the auxiliary signal charge Q1'. The appearance of variation in the charge amount in a sensor part 91 is shown in FIGS. 9(b) and 9(c).

In this way, in a high dynamic range readout type solid-state image pickup device, signal charges are mixed in the vertical transfer register as in the case of the field accumulation readout type solid-state image pickup device, but the vertical transfer register 92 is used half-and-half by the main signal charges Q1, Q2 of the longer exposure time and the auxiliary signal charges Q1', Q2' of the shorter exposure time. A signal output based on the main signal charges (Q1+Q2) and a signal output based on the auxiliary signal charges (Q1'+Q2') are added in the signal processing line. As a result, as is clear from the incident light—signal output characteristic shown in FIG. 6, even after the accumulated signal charge has become saturated for the primary exposure, it is possible to obtain a signal output which is proportional to the actual incident light amount. Therefore it is possible to widen the dynamic range with respect to the light input. This is possible because although the primary exposure may have resulted in a maximum charge amount for the primary signal Q1 or Q2, the auxiliary signal charge provides information for a more accurate reading.

However, in a high dynamic range readout type solid-state image pickup device of the construction described above, because the main signal charge Q2 is read out after the accumulation period of the auxiliary signal charge Q1' has elapsed and accumulation of the auxiliary signal charge Q2' is carried out after that, a time difference of about half of the vertical blanking period arises between the readout time of the auxiliary signal charge Q1' and the readout time of the auxiliary signal charge Q2'. Because the exposure time of the auxiliary signal charges Q1', Q2' is extremely short compared to the exposure time of the main signal charges Q1, Q2, there is a time difference of about half of the vertical blanking period between the readout timings of the auxiliary signal charges Q1', Q2'. In particular, during filming of subjects moving at high speed, there is a problem because the auxiliary signal charges Q1', Q2' each contain information relating to different images. The resultant reproduced picture based on the auxiliary signal charges (Q1+Q2') becomes an unnatural one because the information for reproducing the image is comprised of image information from two different times. FIG. 9(b) and (c) illustrate how Q2 is generated only after the auxiliary charge Q1' is also generated, thus resulting in the above-mentioned timing problem.

SUMMARY OF THE INVENTION

The present invention was made in view of the above-mentioned problem, and an object thereof is to provide a driving method for a solid-state image pickup device in which it is possible to realize a high dynamic range readout without causing unnaturalness in a reproduced picture even when filming a subject moving at high speed. To achieve the above-mentioned objects, in this invention, a solid-state image pickup device is employed wherein pixels are arrayed in two dimensions and vertical transfer registers are provided for each vertical line of pixels to provide sets of packets which correspond to each pixel. During a first vertical blanking period, a main signal charge of a first pixel of one line of two adjacent lines in the vertical direction is read out into a vertical transfer register and immediately thereafter the vertical transfer register is shifted by one pixel. Then a main signal charge of the second pixel corresponding to the other adjacent line of the two lines is read out into the vertical transfer register. Then after a predetermined exposure time has elapsed an auxiliary signal charge of the first pixel is read out into an empty packet of the vertical transfer register and immediately thereafter the vertical transfer register is shifted by one pixel. Then an auxiliary signal charge of the second pixel corresponding to the other line is read out into the vertical transfer register. This unique image transfer method provides more accurate image reproduction while also allowing for increased dynamic range.

For the sake of clarity, throughout the application, signal charges of the longer exposure time will be called main or primary signal charges and signal charges of the shorter exposure time will be called auxiliary signal charges.

BRIEF DESCRIPTION OF THE DRAWINGS

FIG. 2 is an enlarged view of a portion of FIG. 1 which illustrates signal lines for the vertical transfer registers;

FIGS. 4(a)–4(d) illustrate read out and mixing of pixel charges;

DETAILED DESCRIPTION OF THE PREFERRED EMBODIMENTS

Figure 1:
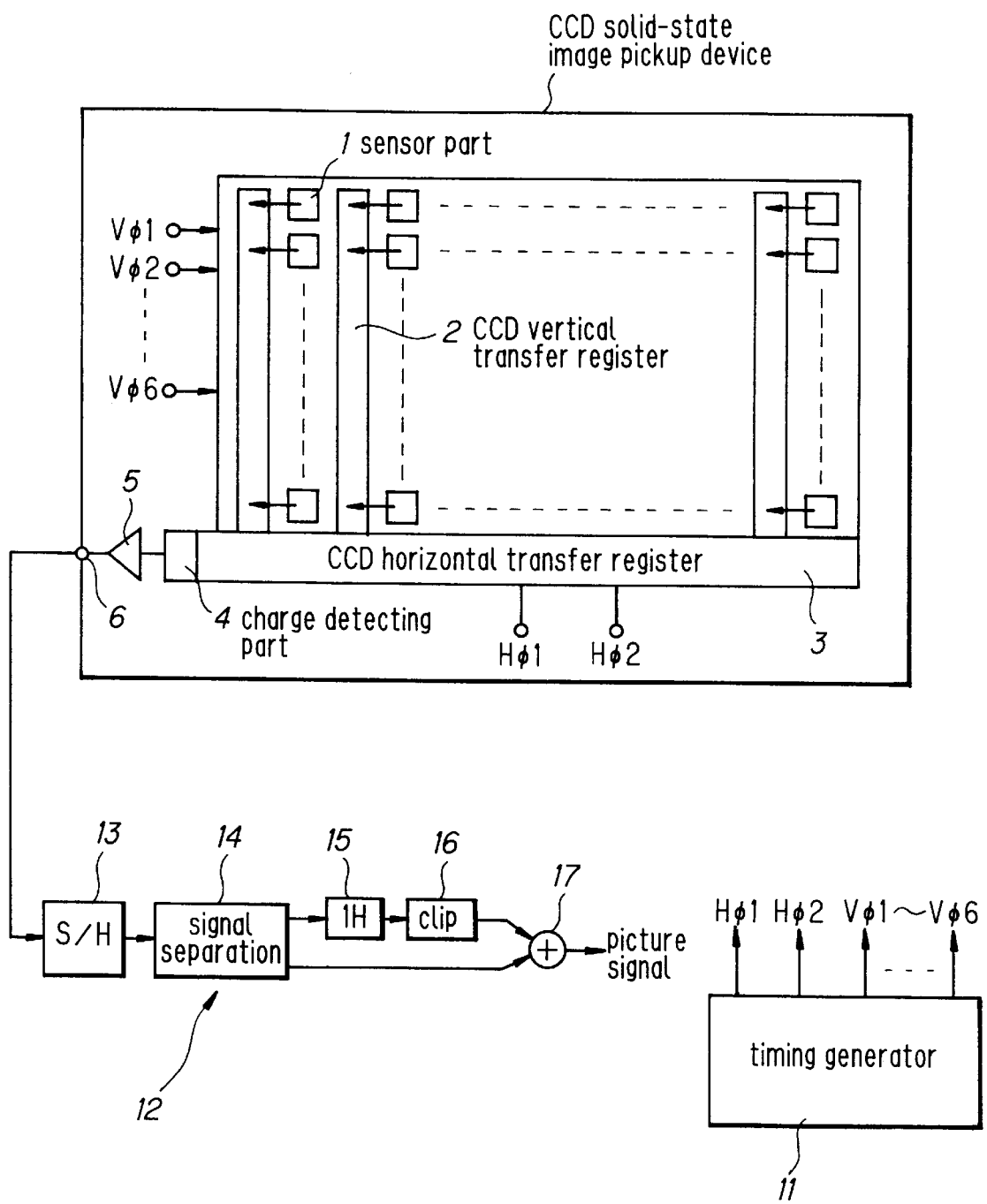
FIG. 1 is a schematic block diagram showing an embodiment of a high dynamic range readout system solid-state image pickup device for the use with to the present invention.

An embodiment of the invention will now be described in detail with reference to the drawings. FIG. 1 is a schematic block diagram showing an embodiment of a high dynamic range readout solid-state image pickup device for performing the present invention. In FIG. 1, multiple sensor parts (pixels) 1 which convert incident light into signal charge of an amount corresponding to a quantity of incident light are arrayed in the vertical direction and the horizontal direction in matrix form. For each vertical row of pixels, a CCD vertical transfer register 2 is provided. This CCD vertical transfer register 2, as shown in FIG. 2, consists of a set of packets 21 provided in 1:1 correspondence with the sensor parts 1. During part of a horizontal blanking period the vertical transfer registers transfer signal charges read out from the sensor parts 1 in pixel units in the vertical direction while shifting them sequentially one pixel at a time.

The signal charges vertically transferred by the CCD vertical transfer register 2 are moved to a CCD horizontal transfer register 3 sequentially one line at a time. The CCD horizontal transfer register 3 transfers this one line of signal charges sequentially in the horizontal direction in a horizontal scanning period after the horizontal blanking period. A charge detecting part 4 consisting of for example a floating diffusion amp. (FDA: Floating Diffusion Amplifier) is provided at the transfer destination end of the CCD horizontal transfer register 3. This charge detecting part 4 detects signal charges horizontally transferred by the CCD horizontal transfer register 3 and converts them into signal voltages. These signal voltages pass through an output circuit 5 consisting of a source follower circuit or the like and then are guided out through an output terminal 6 as a CCD output signal. A CCD solid-state image pickup device 10 for operation in accordance with the present invention is thus disclosed. An example of charge transfer in accordance with the present invention is set forth below. this example, it is presumed that, as shown in FIG. 2, by three transfer electrodes being disposed on each packet 21 of the CCD vertical transfer register 2 and vertical transfer clocks V$\phi$1 to V$\phi$6 being applied to the six transfer electrodes 221 to 223, 231 to 233 on two adjacent packets 21, 21 the CCD vertical transfer register 2 is driven in six phases, and V$\phi$1, V$\phi$2 and V$\phi$4, V$\phi$5 among the vertical transfer clocks V$\phi$1 to V$\phi$6 take three values and signal charges are read out from the sensor parts 1 into the packets 21 of the CCD vertical transfer register 2 at the third value of these. However, during vertical transfer, as is clear from timing waveforms which will be discussed later, it becomes 3-phase drive. Also, it will be understood that the CCD horizontal transfer register 3 is for example one driven in two phases by horizontal transfer clocks H$\phi$1, H$\phi$2. The vertical transfer clocks V$\phi$1 to V$\phi$6 and the horizontal transfer clocks H$\phi$1, H$\phi$2 are generated by a timing generator 11 together with other timing signals used by the system.

Figure 3:
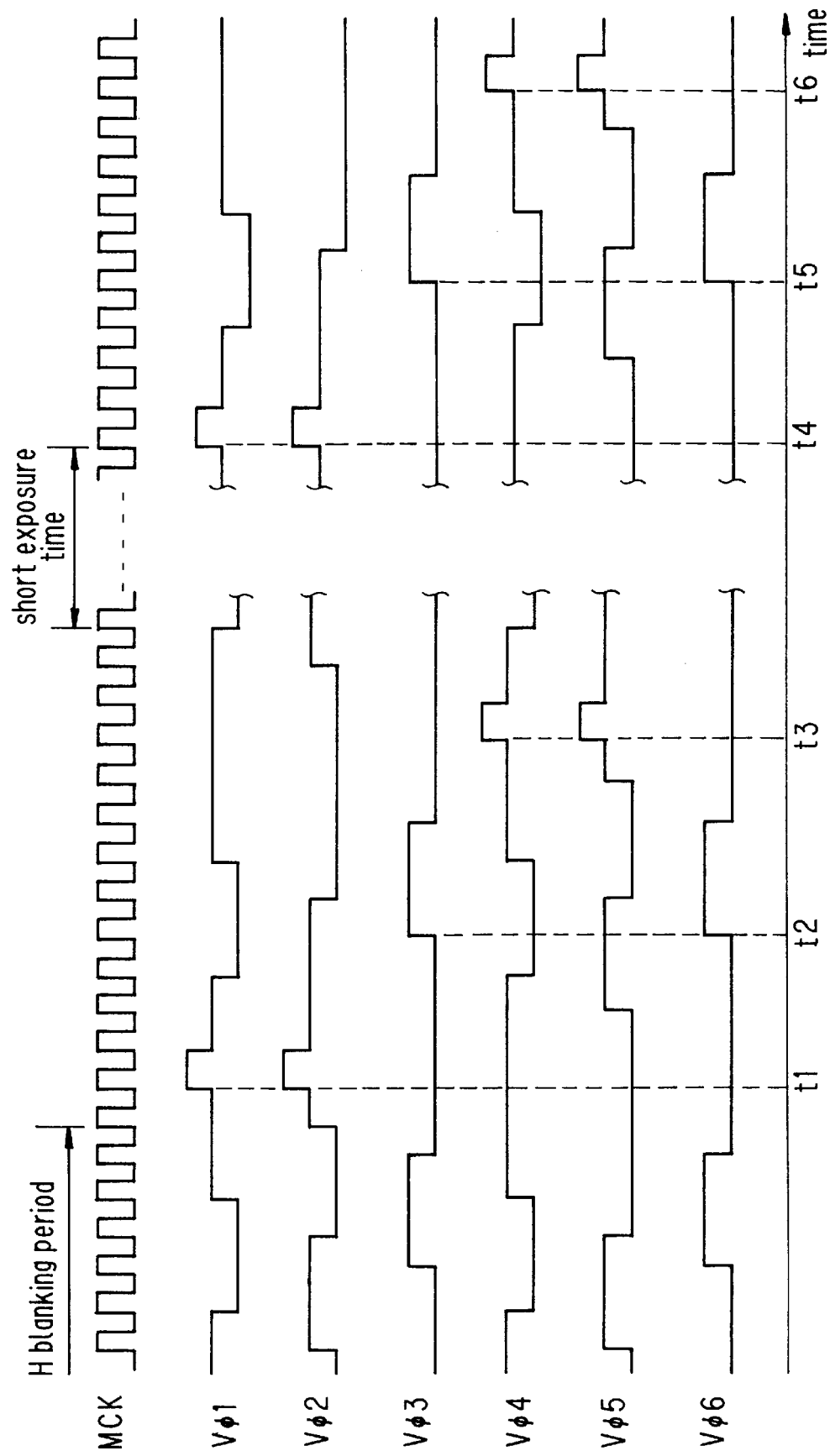
FIG. 3 is a timing chart which illustrates signal timing for use with the present invention.

The timing chart of FIG. 3 illustrates signal timing for performing charge transfer in accordance with the present invention. First, in the CCD vertical transfer register 2, during the horizontal blanking period, by the vertical transfer clocks V$\phi$1 to V$\phi$3, V$\phi$4 to V$\phi$6 sequentially becoming "H"-level (in the cases of V$\phi$1, V$\phi$2, V$\phi$4, V$\phi$5, the middle level of the three values) in synchrony with the master clock MCK, the signal charges of the packets 21 are shifted by one packet (pixel). Then, by the vertical transfer clocks V$\phi$1, V$\phi$2 taking the level of the third value at time t1, a main signal charge Q1 accumulated in a sensor part 1 of a vertical direction odd line is read out into the packet 21 below the transfer electrodes 221, 222. This main signal charge Q1 is shifted by one pixel and is transferred into the packet 21 of the next line by the vertical transfer clock V$\phi$3 becoming "H"-level at time t2 and the vertical transfer clocks V$\phi$4, V$\phi$5 subsequently becoming "H"-level (the middle level of the three values) sequentially in synchrony with the master clock MCK.

Next, by the vertical transfer clocks V$\phi$4, V$\phi$5 taking the level of the third value at time t3, a main signal charge Q2 accumulated in a sensor part 1 of a vertical direction even line is read out into the packet 21 below the transfer electrodes 231, 232. As a result, the main signal charge Q1 of the pixel of the odd line and the auxiliary signal charge Q2 of the pixel of the even line are mixed (Q1+Q2). After that, a predetermined short exposure time is set. Then, after this short exposure time has elapsed, by the vertical transfer clocks Vφ1, Vφ2 taking the level of the third value at time t4, an auxiliary signal charge Q1' accumulated in the sensor part 1 of the vertical direction odd line is read out into the empty packet 21 below the transfer electrodes 221, 222.

This auxiliary signal charge Q1' is read out and the main signal charge (Q1+Q2) of the next line are shifted by one pixel and each is vertically transferred into the packet 21 of the next line by the vertical transfer clocks Vφ3, Vφ5 becoming "H"-level at time t5 and the vertical transfer clocks Vφ4, Vφ5 and the vertical transfer clocks Vφ1, Vφ2 subsequently becoming "H"-level (the middle level of the three values) sequentially in synchrony with the master clock MCK. Next, by the vertical transfer clocks Vφ4, Vφ5 taking the level of the third value at time t6, an auxiliary signal charge Q2' accumulated in the sensor part 1 of the vertical direction even line is read out into the packet 21 below the transfer electrodes 231, 232. As a result, the auxiliary signal charge Q1' accumulated in the pixel of the odd line and the auxiliary signal charge Q2' accumulated in the pixel of the even line are mixed (Q1'+Q2').

By the operation described above being repeated, reading out, mixing and vertical transfer of the main signal charges Q1, Q2 of the long exposure time and the auxiliary signal charges Q1', Q2' of the short exposure time are carried out. A concept view of this is shown in FIGS. 4(a)–4(d). In FIGS. 4(a)–4(d), 1) shows the readout time of the main signal charge Q1, 2) the readout time of the main signal charge Q2, 3) the readout time of the auxiliary signal charge Q1' and 4) the readout time of the auxiliary signal charge Q2'.

In this way, during the vertical blanking period, first the main signal charge Q1 of the pixel of the vertical direction odd line is read out into the CCD vertical transfer register 2 and immediately thereafter the CCD vertical transfer register 2 is shifted by one pixel. Next the main signal charge Q2 of the pixel of the vertical direction even line is read out into the CCD vertical transfer register 2 and then after a predetermined exposure time has elapsed the auxiliary signal charge Q1' of the pixel of the vertical direction odd line is read out into the empty packet 21a of the CCD vertical transfer register 2 and immediately thereafter the CCD vertical transfer register 2 is shifted by one pixel. Then the auxiliary signal charge Q2' of the pixel of the vertical direction even line is read out into the CCD vertical transfer register 2 whereby the difference of the readout timing of the main signal charges Q1 and Q2 and the auxiliary signal charges Q1' and Q2' can be set regardless of the short exposure time and therefore great shortening of the signal readout time is possible.

Figure 5A:
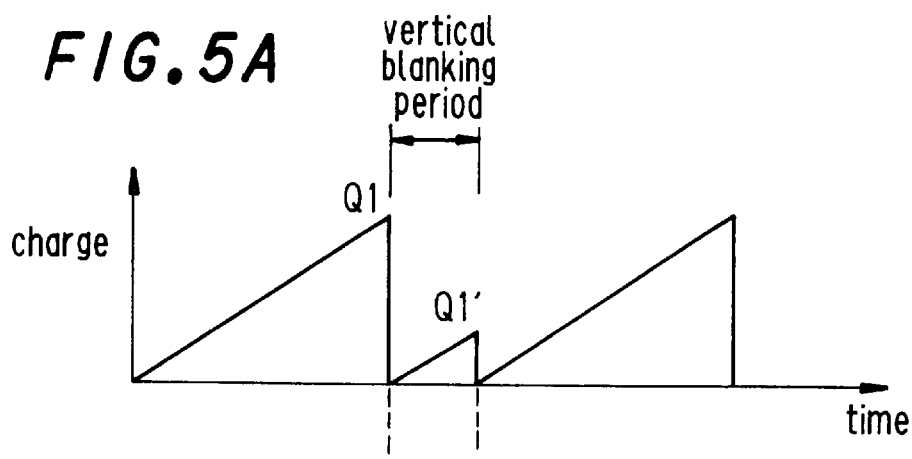
FIGS. 5(a) and (b) set forth a chart which illustrates the accumulation of charge from pixels.
Figure 5B:
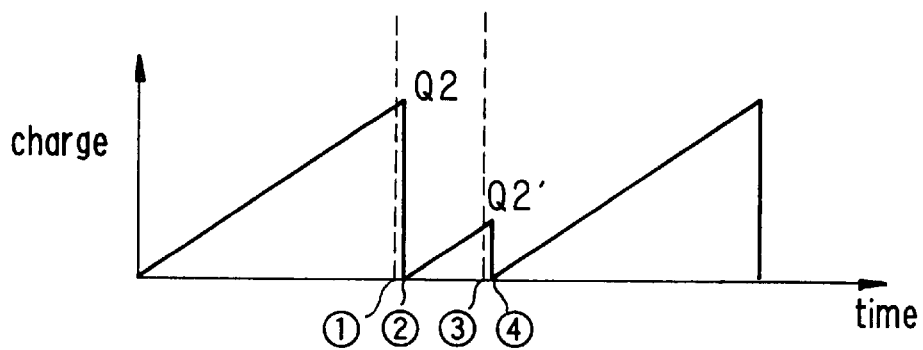

That is, in the conventional technology described above, the main signal charge Q2 is read out only after the accumulation period of the auxiliary signal charge Q1' has elapsed and accumulation of the auxiliary signal charge Q2' is carried out thereafter. Therefore the time difference for the exposure time of the auxiliary signal charge Q2' (half the vertical blanking period) has arisen between the readout timing of the auxiliary signal charge Q1' and the readout timing of the auxiliary signal charge Q2'. As shown in FIG. 5, however, with the present invention, it is possible to shorten this to the time taken for the CCD vertical transfer register 2 to be shifted by one pixel. Specifically, assuming that the period of the master clock MCK is about 0.5 μsec. to 0.8 μsec., in the case of this embodiment, because 9 clocks are necessary to shift the CCD vertical transfer register 2 by one pixel, the difference of readout timing between the main signal charges Q1 and Q2 and the auxiliary signal charges Q1' and Q2' can be shortened to about 4.5 μsec. to 7.2 μsec.

This also means that the degree of freedom with respect to setting range of the shorter exposure time can be increased. That is, whereas in the case of the conventional technology, because the main signal charge Q2 is read out after the accumulation period of the auxiliary signal charge Q1' has elapsed and accumulation of the auxiliary signal charge Q2' is carried out after that, it was only possible to set the shorter exposure time to half of the vertical blanking period. In the case of this embodiment it is possible to set it freely throughout the range of the vertical blanking period. In practice, the shorter exposure time is determined by how the charge amount ratio of the main signal charges Q1, Q2 and the auxiliary signal charges Q1', Q2' is set.

Specifically, in the case of the NTSC broadcasting system, because there are 525 scanning lines and among these there are 485 effective scanning lines, there are 40 non-effective scanning lines. Because interlacing is carried out, the result is that there are 262.5 scanning lines, 242.5 effective scanning lines and 20 non-effective scanning lines. Because the main signal charges Q1, Q2 and the auxiliary signal charges Q1', Q2' respectively correspond to the effective scanning lines and the non-effective scanning lines, the ratio thereof becomes 242.5:20, or substantially 12:1, which is a large ratio. For example, when set to 20:1, all that is necessary is that the shorter exposure time be set to the time corresponding to 12 lines, i.e., since 1H (one horizontal scanning period) is 63.5 μsec., about 762 μsec. (=63.5 μsec.×12).

The main signal charges (Q1+Q2) and the auxiliary signal charges (Q1'+Q2') are moved from the CCD vertical transfer register 2 into the CCD horizontal transfer register 3 one line at a time, then they are sequentially transferred in the horizontal direction by the CCD horizontal transfer register 3, converted into signal voltages by the charge detecting part 4 and outputted through the output circuit 5 from the output terminal 6 as a CCD output signal. This CCD output signal is signal-processed by a signal processing circuit 12 which will be described below.

In FIG. 1, the signal processing circuit 12 is made up of a sample-hold (S/H) circuit 13 which sample-holds the CCD output signal, a signal separating circuit 14 which in line units alternately separates and outputs the output signal of this sample-hold circuit 13, a 1H delaying circuit 15 which delays the output signal of one of the lines by 1H (one line), a clipping circuit 16 which carries out processing on the output signal of this 1H delaying circuit 15 to cut off signal waveforms above a predetermined level (clipping) and an adding circuit 17 which adds the output signal of the one line clipped by this clipping circuit 16 to the output signal of the other line and outputs this as a picture signal.

In this signal processing circuit 12, the CCD output signal output from the CCD solid-state image pickup device 10 is sample-held by the sample-hold circuit 13 and then fed into the signal separating circuit 13. This CCD output signal, as is clear from that which has been described above, is a signal wherein a signal based on the main signal charges (Q1+Q2) and a signal based on the auxiliary signal charges (Q1'+Q2') are connected in line units alternately. Accordingly, in the signal separating circuit 14, it is divided up into an output signal based on the main signal charges (Q1+Q2) and an output signal based on the auxiliary signal charges (Q1'+Q2'). The output signal based on the main signal charges (Q1+Q2) is fed through the 1H delaying circuit 15 and then into the clipping circuit 16. In this clipping circuit 16, processing to remove overflow blurring is carried out by removing signal waveforms which are above a predetermined level which is slightly lower than the saturation level of the main signal charges (Q1+Q2).

Figure 6:
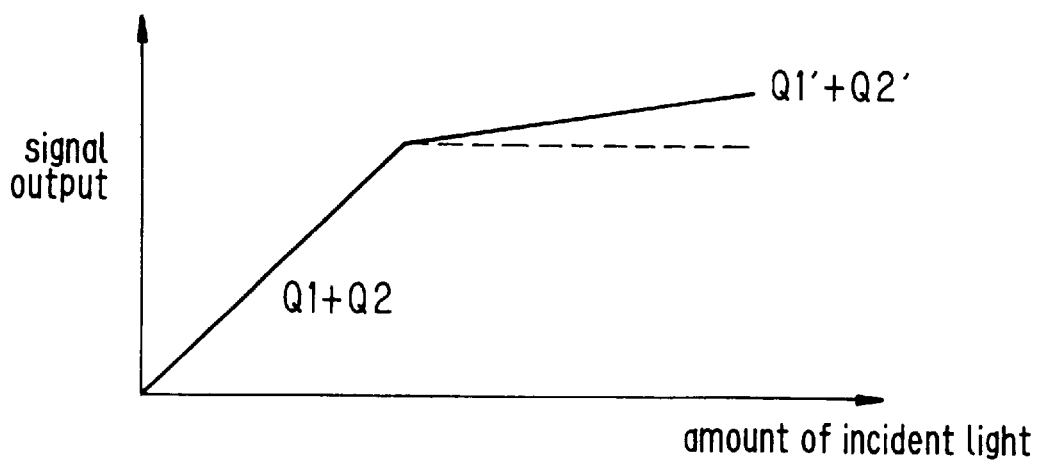
FIG. 6 illustrates the increase of dynamic range through combining primary and auxiliary changes.
Figure 7A:
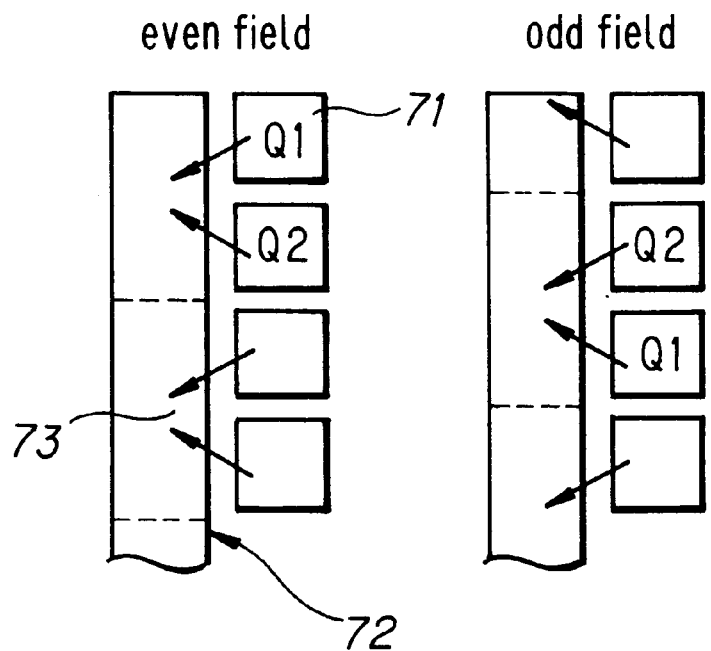
FIGS. 7(a) and (b) set forth a schematic block diagram which illustrates a conventional field readout method.
Figure 7B:
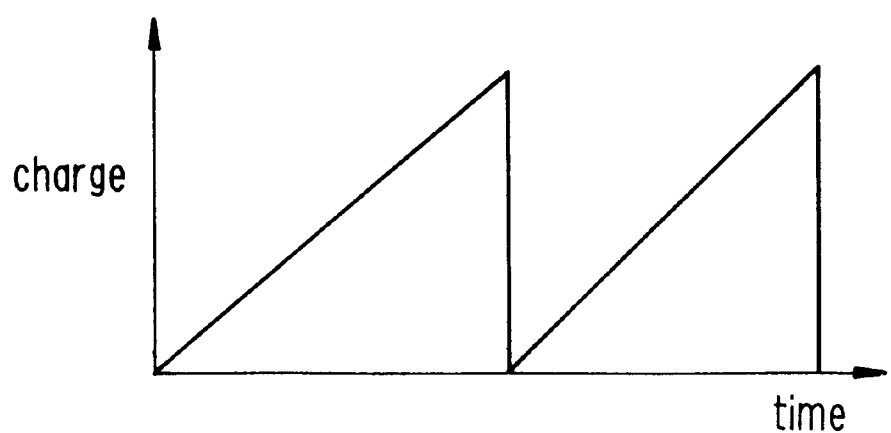
Figure 8A:
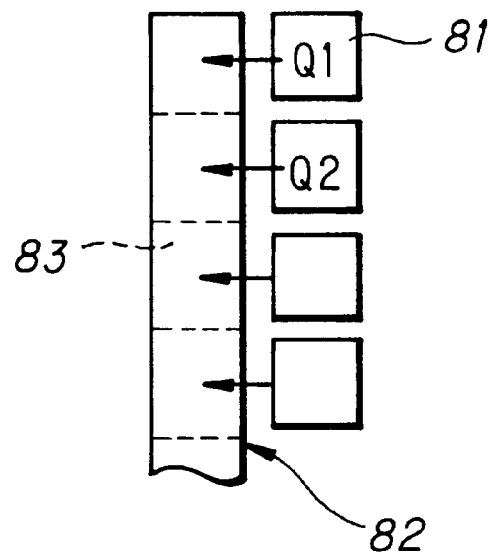
FIG. 8 is schematic block diagram which illustrates a conventional all-pixel readout method.
Figure 8B:
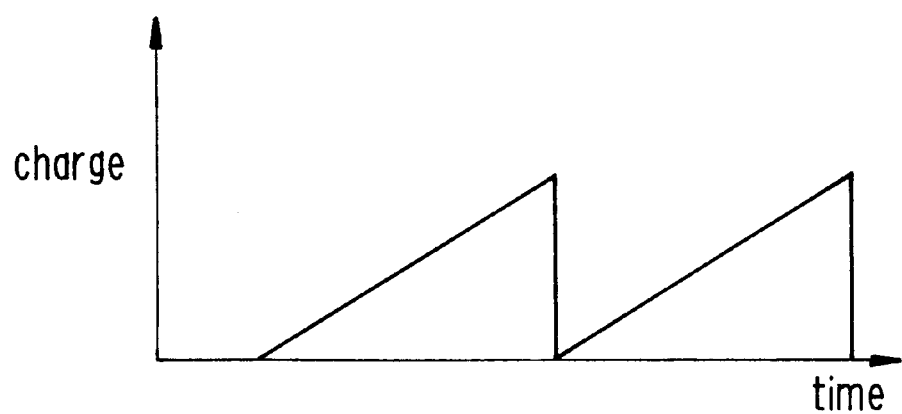
Figure 9A:
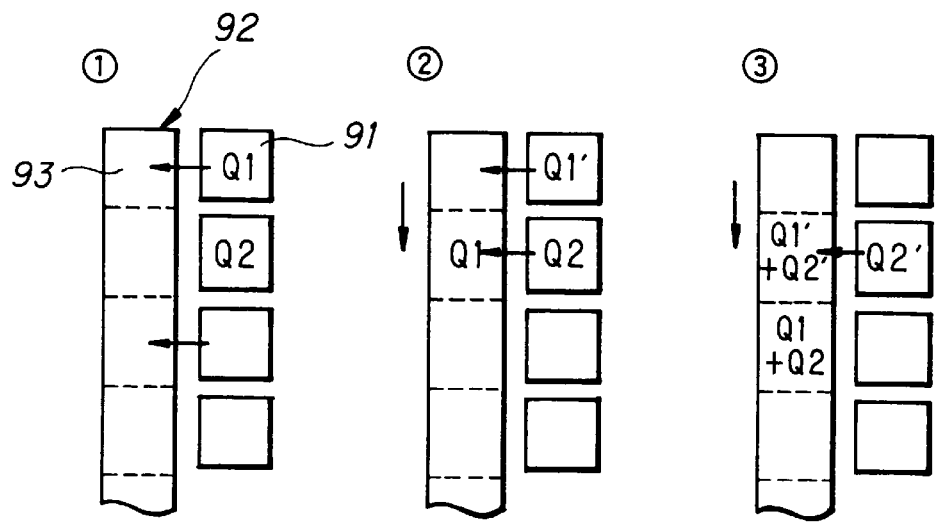
FIGS. 9(a) to (c) provide a schematic block diagram which illustrates a high dynamic range readout method.
Figure 9B:
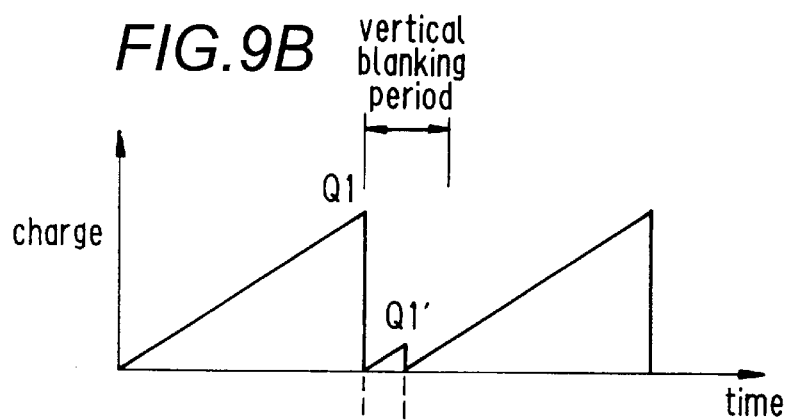
Figure 9C:
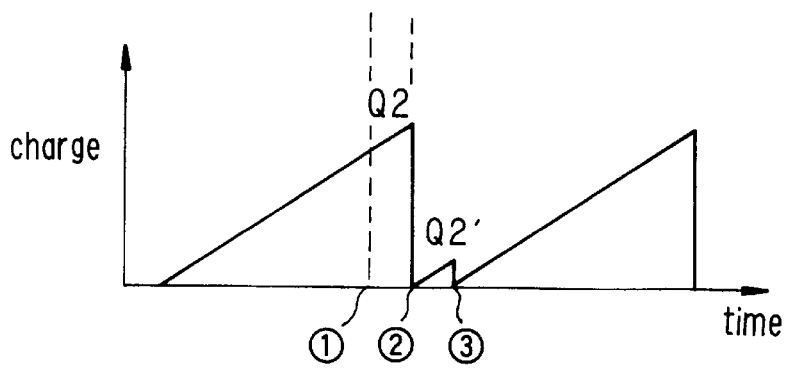

Then, a final picture signal is obtained from the output signal based on the auxiliary signal charges (Q1'+Q2') being added to the output signal based on the main signal charges (Q1+Q2) from which overflow blurring has been removed in the adding circuit 17. The characteristic of this picture signal output which is proportional with respect to the amount of incident light is shown in FIG. 6. As is clear from this characteristic, by setting a short predetermined exposure time and obtaining the auxiliary signal charges Q1', Q2' after the main signal charges Q1, Q2 of the long exposure time are obtained and adding the output signal based on the auxiliary signal charges (Q1'+Q2') to the output signal based on the main signal charges (Q1+Q2) it is possible to obtain a signal output which is proportional with respect to incident light even after signal charge has overflowed in the sensor part 1. Thus, it is possible to widen dynamic range with respect to light input. In light of the foregoing, it is possible to realize a CCD solid-state image pickup device with which the readout timing difference between the main signal charges Q1 and Q2 and the auxiliary signal charges Q1' and Q2' is even while providing a high dynamic range readout.

The embodiment described above employed a CCD vertical transfer register 2, having three transfer electrodes disposed on each packet and which employs 3-phase driving during vertical transfer and 6-phase driving is used during readout and mixing. These are only illustrative examples and the invention is not limited to these specific embodiments. For example, it is also possible to employ a driving system wherein four transfer electrodes are disposed on each packet and 4-phase driving is used during vertical transfer and 8-phase driving is used during readout and mixing. It is thus possible to realize high dynamic range readout without causing unnaturalness in the reproduced picture, particularly even when filming a subject moving at high speed.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A method of driving a CCD imaging device, wherein said CCD imaging device comprises a solid-state image pickup device having a plurality of pixels for receiving light to generate signal charges arranged in rows and a plurality of vertical transfer registers connected to corresponding rows of pixels for transferring said signal charges in a vertical direction, said vertical transfer registers including a plurality of packets provided in correspondence with each pixel, and further comprising a signal processing circuit;

said method comprising the steps of;

reading out primary signal charges from pixels for a plurality of first lines of adjacent first and second lines in a vertical direction into corresponding first packets of said vertical transfer registers during a vertical blanking period, driving said vertical transfer registers thereby to shift said primary signal charges from the first packets to second packets corresponding to adjacent pixels of said second lines, reading out primary signal charges for pixels of a plurality of second lines of the first and second lines into the second packets of said vertical transfer registers;

reading out auxiliary signal charges of pixels for a plurality of first lines into empty first packets of the vertical transfer registers after a predetermined exposure time has elapsed during said vertical blanking period;

driving said vertical transfer registers to shift said auxiliary signal charges from the first packets to second packets corresponding to adjacent pixels of said second lines;

reading out auxiliary signal charges of the pixels for a plurality of second lines into said second packets of said vertical transfer registers, driving said vertical transfer register to provide output signals based on said primary and auxiliary signal charges from said solid state image pickup device;

applying said output signals to said signal processing circuit;

adding said output signals based on said auxiliary signal charges to said output signals based on said primary signal charges to output picture signals; and wherein a time of generating auxiliary signal charges of pixels for the first line overlaps with a time of generating auxiliary signal charges for the second line.

2. A method of driving a CCD image device according to claim 1, wherein said vertical transfer registers have 6 transfer gate electrodes attached to a pair of adjacent pixels.

3. A method of driving a CCD image device according to claim 2, wherein a 6 phase transfer clock is applied to said transfer gate electrodes.

4. A method of driving a CCD image device according to claim 1, wherein said output signals based on primary signal charges are clipped at a predetermined level, and these clipped output signals based on said primary signal charges are added to said output signals based on said auxiliary signal charges.

5. A method of driving a CCD image device of claim 1, wherein said imaging device is used to generate picture signals in a video camera.

6. A method of driving a CCD imaging device according to claim 5, wherein each of said vertical transfer registers have 6 transfer gate electrodes attached to a pair of adjacent pixels.

7. A method of driving a CCD imaging device according to claim 5 wherein said output signals based on the primary signal charges is clipped at a predetermined level after being delayed for a time equivalent to one horizontal period; and further, wherein the clipped horizontal period output signals based on the primary signal charges are added to said output signals based on auxiliary signal charges and outputted as picture signals.

8. A method of driving an image pick-up device according to claim 7 wherein said transfer registers have 6 transfer gate electrodes attached to a pair of adjacent pixels.

9. A method of driving a CCD imaging device, wherein said imaging device comprises a plurality of rows of pixels connected to corresponding adjacent vertical transfer registers for transferring said signal charges to a horizontal transfer, and a signal processing circuit attached to an output of the horizontal transfer register, said method comprising the steps of:

producing first and second main signal charges in corresponding odd and even rows of said pixels by accumulating charges in the odd rows and even rows of pixels for a predetermined first period of time, mixing said first and second main signal charges from said corresponding odd rows and even rows of pixels in the vertical transfer registers;

producing first and second auxiliary signal charges in the corresponding odd and even rows of pixels by accumulating charges in the odd rows and even rows of pixels for a predetermined second period of time within a blanking period;

mixing said first and second auxiliary signals from said odd rows and even rows of pixels; transferring mixed main exposure signal charges and mixed auxiliary exposure signal charges independently through said transfer registers out of said image pickup device to provide first and second output signals corresponding to respective mixed main and mixed auxiliary output signals to said signal processing circuit, adding said mixed auxiliary output signals to said mixed main exposure signal charges to provide an output picture signal and, wherein said predetermined second exposure time period for odd rows overlaps with said predetermined second exposure time period for even rows.

10. A method of driving a CCD imaging device according to claim 9 wherein 6 phase transfer clocks are applied to said transfer gate electrodes.

11. A method of driving an image pickup device having a plurality of rows of pixels for accumulating signal charges and transfer registers for transferring said signal charges thereby to output said signal charges, said method comprising the steps of:

producing first and second main signal charges in corresponding odd rows and even rows of pixels by accumulating charges in odd rows and even rows of pixels for a predetermined long exposure time period;

mixing said first and second main signal charges from odd rows and even rows of pixels in a packet of a vertical transfer register, producing first and second auxiliary signal charges in corresponding odd rows and even rows of pixels by accumulating charges in odd rows and even rows of pixels for a predetermined second exposure time period within a blanking period;

mixing said first and second auxiliary signals from odd rows and even rows of pixels, outputting mixed first exposure signal charges and mixed second exposure signal charges independently through said transfer registers, wherein said predetermined second exposure time period for odd rows overlaps with said predetermined second exposure time period for even rows.

12. A method of driving an image pick-up according to claim 11 wherein 6 phase transfer clock are applied to said transfer gate electrodes.

13. The method of driving an image pickup device of claim 11, wherein said image pickup device is used to generate picture signals in a video camera.

14. A method of driving a CCD imaging device wherein said imaging device is comprised of a plurality of rows of pixels and a corresponding plurality of vertical transfer registers, each of said vertical transfer registers being connected to an adjacent vertical row of pixels, said method comprising the steps of:

generating a first exposure signal charge in each adjacent first and second pixels connected to a vertical charge transfer register;

mixing the first exposure signal charges from the first and second pixels in a packet of the vertical transfer registers;

generating an auxiliary exposure signal charge in each of the first and second adjacent pixels;

mixing the auxiliary exposure signal charges, and wherein the first exposure signal charge of the second pixel is generated prior to generation of the auxiliary exposure signal charge of the first pixel.

15. The method of driving a CCD image device of claim 14, wherein said imaging device is used to generate picture signals in a video camera.

* * * * *